United States Patent [19]

Komatsubara et al.

[11] Patent Number: 4,695,011
[45] Date of Patent: Sep. 22, 1987

[54] CASSETTE TAPE MACHINE

[75] Inventors: Masahiro Komatsubara; Tetsuro Kamimura; Takugi Inanaga; Akira Takahashi, all of Saitama, Japan

[73] Assignee: Pioneer Electronic Corporation, Tokyo, Japan

[21] Appl. No.: 333,510

[22] Filed: Dec. 22, 1981

[30] Foreign Application Priority Data

Dec. 26, 1980 [JP] Japan .............................. 55-186647[U]
Dec. 26, 1980 [JP] Japan .............................. 55-186648[U]
Dec. 26, 1980 [JP] Japan .............................. 55-186649[U]
Dec. 26, 1980 [JP] Japan .............................. 55-186651[U]

[51] Int. Cl.⁴ ............................................ G11B 15/32
[52] U.S. Cl. .................................... 242/199; 245/68.3
[58] Field of Search ............... 242/197, 198, 199, 200, 242/46.21, 46.6, 46.7, 68.1, 68.2, 68.3

[56] References Cited

U.S. PATENT DOCUMENTS

| | | | |
|---|---|---|---|
| 1,775,610 | 9/1930 | Weiss | 242/68.3 |
| 2,904,277 | 9/1959 | Underwood | 242/68.3 |
| 3,132,817 | 5/1964 | Atwood et al. | 242/46.21 X |
| 3,512,734 | 5/1970 | Priest | 242/197 |
| 3,593,933 | 7/1971 | Grashorn | 242/68.2 X |
| 3,791,604 | 2/1974 | Meermans | 242/68.3 |

FOREIGN PATENT DOCUMENTS 629761 7/1963 Belgium ........................ 242/46.21
2154233 8/1973 Fed. Rep. of Germany ..... 242/68.3

OTHER PUBLICATIONS

IBM Technical Disclosure Bulletin, vol. 8, No. 8, Jan. 1966, 1124.

Primary Examiner—John M. Jillions
Attorney, Agent, or Firm—Sughrue, Mion, Zinn, Macpeak & Seas

[57] ABSTRACT

The reel hub in a tape machine is resiliently coupled to the reel shaft during rotation at least in a tape supply direction. The resilient coupling is either via one or more spring members or via one or more viscous elastic members.

9 Claims, 48 Drawing Figures

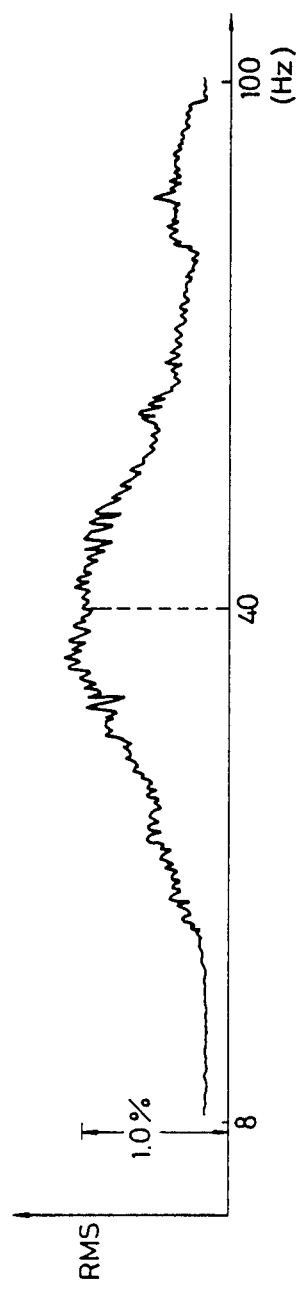
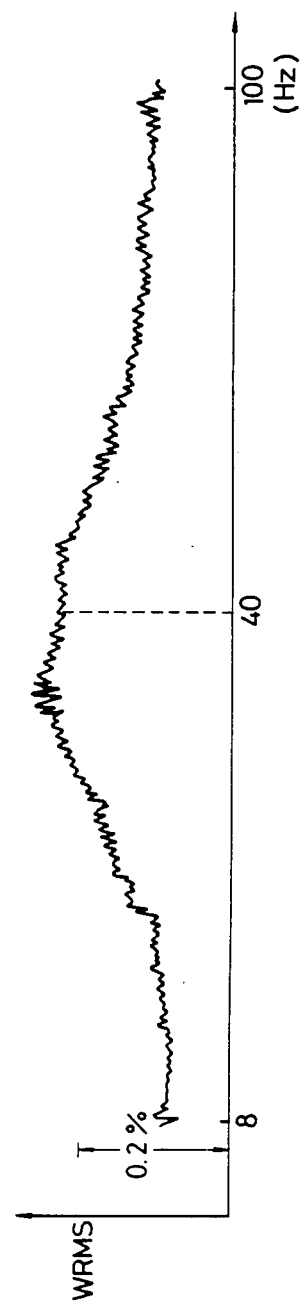

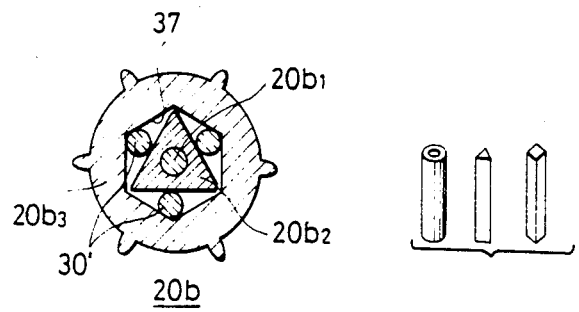
FIG. 33  FIG. 34  FIG. 35
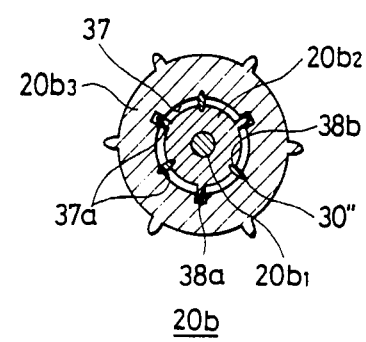
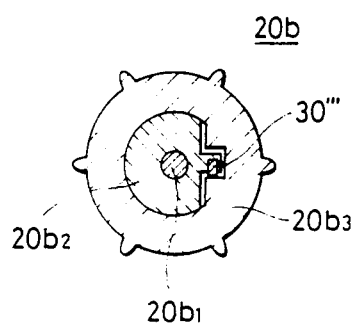
FIG. 36
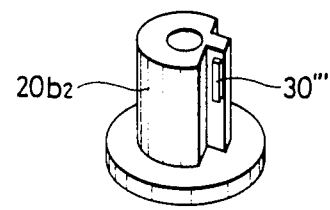
FIG. 37
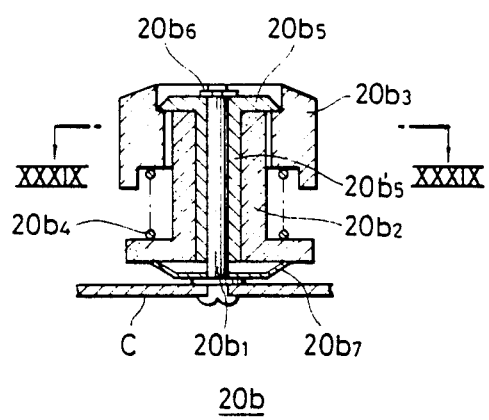
FIG. 38
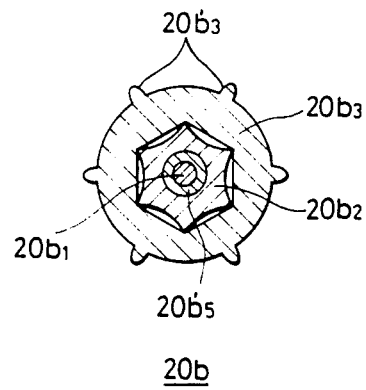
FIG. 39

CASSETTE TAPE MACHINE

BACKGROUND OF THE INVENTION

The present invention relates to a cassette tape recorder for automatic stereo sets.

It is well known from experience that an ordinary cassette tape recorder may produce a high quality sound when a vehicle in which the cassette tape recorder is installed is in a stationary condition but that the same tape recorder may produce a poor quality sound when the vehicle is in motion and is experiencing large up-and-down vibrations. It is also played is large, wow is increased to thereby result in a poor quality sound production.

Various studies of this wow phenomenon have been made by the present invention. In one experiment, an up-and-down vibration of 1G was applied to an ordinary cassette tape recorder at a changing frequency, and the resulting wow was measured. The results are shown in FIG. 1, which is a graph shwoing the wow (RMS) characteristics vs. frequency. As is apparent from the characteristic curve, wow exceeding 1% was generated at vibration of 40 Hz and also at 100 Hz or more. These characteristics were measured in another way, that is, in an auditory sense compensation, and the results were as shown in FIG. 2. The wow generated at the vibration of 100 Hz or more was less than 0.2% and caused no problem, but the wow generated at about 40 Hz was still more than 0.2%, which caused the quality of sound to be degraded.

Detailed analyses of the wow at 40 Hz were then made, which can be understood with reference to the structures of a conventional tape recorder and the tape cassette and operations thereof as will be explained in detail with reference to FIGS. 3 through 8.

Referring first to FIGS. 3 and 4, a tape cassette case generally designated by reference numeral 1 is made up of cassette halves 1a and 1b and a tape 2 encased therein. The tape 2 is fixed at either end to a pair of reels 3a and 3b by means of respective clampers 4a and 4b, so that the tape can be wound onto the reels 3a and 3b. Thus, the when the winding diameter of tape on one side is increased, the winding diameter of tape on the other side is decreased. In the drawings, the tape is fully wound on supply reel 3b. It is a typical feature of the tape cassette that no flanges are provided on the reels 3a and 3b, to thereby decrease the distance between reels 3a and 3b, which in turn leads to a miniaturization of the overall physical cassette size. However, without flange members, the tape may be wound on the reels 3a and 3b non-uniformly in a width wise direction. In order to eliminate this defect, i.e., to prevent the tape from contacting with the inner walls of the cassette halves 1a and 1b, and in order to achieve such prevention without causing any substantial additional friction, a space is provided between the tape and each inner wall of the cassette halves 1a and 1b, and a sheet 5a or 5b which is a so called "retainer" is interposed in this space so that the reels 3a and 3b are retained at a suitable position within the case 1.

A pair of guide rollers 6a and 6b, a pressure pad 7, and the like are encased in the case together with the tape 2 and the reels 3a and 3b. In the walls of the case 1 are formed a pair of capstan shaft insertion holes 8a and 8b, positioning pin insertion holes 9a, 9b, 9c and 9d, a pair of pinch roller insertion holes 10a and 10b, reel shaft insertion holes 11a and 11b, and a magnetic head insertion hole 12. Reference characters 3a' and 3b' denote engagement lips formed at an angular interval of 60° on the circumferential periphery of the reel 3a or 3b.

On the other hand, the cassette tape recorder comprises a pair of reel shafts 20a and 20b, a capstan shaft 21, a pinch roller 23 and a magnetic head 24. When the tape cassette 1 is mounted on the tape recorder, the reel shafts 20a and 20b are inserted through the reel shaft insertion holes 11a and 11b into the interior of the tape cassette 1 and engage with the reels 3a and 3b. At the same time, the capstan shaft 21 is inserted into the capstan shaft insertion hole 8a. Then, when the tape recorder is played, the pinch roller 23 is inserted through the pinch roller insertion hole 10a into the interior of the tape cassette 1 to clamp the tape 2 against the capstan shaft 21 so that the pinch roller cooperates with the capstan shaft 21 rotating at a constant speed to move the tape 2 at a constant speed. At the same time, the magnetic head 24 is inserted through the magnetic head insertion hole 12 into the interior of the cassette case 1 to clamp the tape 2 against the pressure pad 7 to thereby reproduce the information recorded on the tape 2.

In the thus described play condition, the reel shaft 20a serves to take up the tape 2 and is driven by a drive source (not shown), whereas the reel shaft 20b serves to feed the tape 2 and is not driven by the source, but instead the reel shaft 20b is adapted to apply a constant back tension to the tape 2.

The reel shaft 20b on the supply side of conventional construction is shown in FIGS. 5 and 6, wherein the character C denotes a chassis of the cassette tape recorder, from which an upright shaft $20b_1$ extends vertically. A reel shaft member $20B_2$ having a regular hexagonal cross section is freely rotatably mounted on the upright shaft $20b_1$. A cylindrical hub $20b_3$ surrounds the shaft $20b_2$ so as to be slidable in the axial direction but to positively engage with the shaft member $20b_2$ with respect to the horizontal or rotational direction. The cylindrical hub $20b_3$ is biased to move in one direction by a spring $20b_4$ interposed between the bottom surface of the hub and the facing portion of the shaft member $20b_2$. The hub $20b_3$ is held at a position shown by a retaining member $20b_5$ tightly engaged with the shaft member $20b_2$.

As described above, the shaft member $20b_2$, the cylindrical hub $20b_3$, the spring $20b_4$ and the retaining member $20b_5$ are formed in a unit which is prevented from being pulled apart from the upright shaft $20b_1$ by means of a stopping member $20b_6$ mounted on the top end of the upright shaft $20b_1$, as shown in FIG. 5. A leaf spring $20b_7$ interposed between a flanged portion of the upright shaft $20b_1$ and the shaft member $20b_2$ is provided in order to produce a constant frictional force between the reel shaft unit and the upright shaft $20b_1$ to thereby apply a back tension to the tape 2. With the thus constructed reel shaft 20b, when the tape cassette is inserted, if the reel lips 3b' of the cassette are not properly meshed with the outer projections $20b'_3$ of the cylindrical hub $20b_3$, the cylindrical hub $20b_3$ may be pressed downwardly so that no damage occurs. If a simpler construction is desired, as shown in FIG. 7, projections $20b'_2$ may be formed directly on the shaft member $20b_2$ with the shaft member rotatably mounted on the upright shaft $20b_1$. The leaf spring $20b_7$ provides back tension and is also provided with somewhat more bending range.

Now, when the above-described tape recorder is in the play condition, let us assume that an up-and-down vibration is applied thereto as shown by the arrow in FIG. 4. When the frequency of vibration is very low, e.g. about 1 Hz, the reels 3a and 3b are vibrated together with the case 1 and chassis C. However, when the frequency is increased, the reels 3a and 3b may remain relatively stationary while only the case 1 vibrates vertically together with the chassis C. For this reason, the upper and lower inner walls of the case 1 collide against the reels 3a and 3b with high energy. In such a condition, the tape 2 may be elongated or shortened between the point a on the tape 2 clamped between the capstan shaft 21 and the pinch roller 23 and the point b at the winding end of the reel 3b.

It is to be noted that the tape 2 between the above described points a and b has a resonance at a resonance frequency $f_O$ which is determined according to the spring constant of the tape 2 and the inertial moment of the tape wound on the reel 3b. Now, when the value of $f_O$ is calculated with a typical back tension of 2 to 3g, a value of $f_O = 30-40$ Hz, is derived.

When the cassette tape recorder is in its play condition, as shown in FIG. 8a, the projections 3b' of the supply reel 3b are engaged with the projections 20b'₃ of the reel shaft 20b so that the projections 3b' rotate the reel shaft 20b while the supply reel is rotated in the direction of the arrow. However, when the above noted resonance is generated, the rotation of the reel 3b may be stopped by the elongation of the tape 2 as shown in FIG. 8b. Thereafter, due to the reduction of the tape, the reel 3b is rapidly rotated to thereby rotate the reel shaft 20b with high energy and at a higher speed as shown in FIG. 8c. For this reason, a reactive force occurs whereby the shaft projections 20b'₃ push back on the reel projections 3b' so that, with the next elongation of the tape 2, the projections 3b' and 20b'₃ of both members are separated from each other as shown in FIG. 8d. Once such a state is generated, collision and reaction are alternately generated between the projections 3b' and 20b'₃ to thereby cause a so-called jitter. As a result, the travelling speed of the tape 2 on the surface of the magnetic head 24 is changed, which causes wow to be generated at about 40 Hz.

SUMMARY OF THE INVENTION

In view of the above noted defects, the present invention provides as an object a cassette tape recorder in which no significant wow is generated when a vertical vibration is applied thereto, thereby enhancing the sound quality.

According to the present invention, the shaft and hub are resiliently coupled in at least the tape supply direction, with the resilient coupling operating to absorb and damp some of the sudden energy imparted to the shaft during resonance of the tape.

According to one embodiment of the present invention, a reel shaft at least on a tape supply side is composed of a shaft member having on its outer periphery thin elastic pieces formed integrally therewith of synthetic resin and a cylindrical hub having inner surfaces with which the elastic thin pieces contact in a spring biased manner. Projections which engage with the reels of a cassette are formed on the outer periphery of the hub, and by a rotation in a tape feeding direction of the cylindrical hub, the shaft member is rotated through the thin elastic pieces. With such an arrangement, a collision and a reaction generated between the tape feeding reel shaft and the cassette reel are damped to thereby reduce a resonance of the tape and to thereby reduce wow to a small level.

In a further embodiment, the outer periphery of the shaft and inner surface of the hole in the center of the hub are formed with non-matching surface configurations and a torsional spring coupling is provided between the shaft and hub. The spring biases the hub and shaft in one relative direction and absorbs impact during the tape feed operation while the surfaces abut for positive drive during take-up operation.

In a still further embodiment, the shaft and hub are separated by a resilient packing which is deformable to absorb the surges in tape reel movement and dampen the tape resonance.

In still a further embodiment, the shaft member itself may be a resilient member.

Various modifications of specific shaft and hub configurations are shown.

BRIEF DESCRIPTION OF THE DRAWINGS

In the drawings:

FIG. 12 is a graph showing the wow characteristics of the cassette tape recorder having the shaft unit of FIG. 9 according to the present invention, before auditory compensation;

FIG. 13 is a graph showing wow characteristics of the cassette tape recorder having the shaft unit of FIG. 9 according to the present invention, after auditory compensation;

FIG. 33 is a cross sectional view of another embodiment according to the present invention;

FIG. 34 shows various shapes of the tubular members used in the shaft unit shown in FIG. 33;

FIGS. 35 and 36 are other modifications of the shaft units according to the present invention;

FIG. 37 is a perspective view of the shaft member used in the shaft unit shown in FIG. 36;

FIG. 38 is a cross sectional view showing still another embodiment of a shaft unit for the tape recorder according to the present invention;

FIG. 39 is a cross sectional view taken along the line XXXIX—XXXIX of FIG. 38;

DETAILED DESCRIPTION OF THE INVENTION

Figure 1:
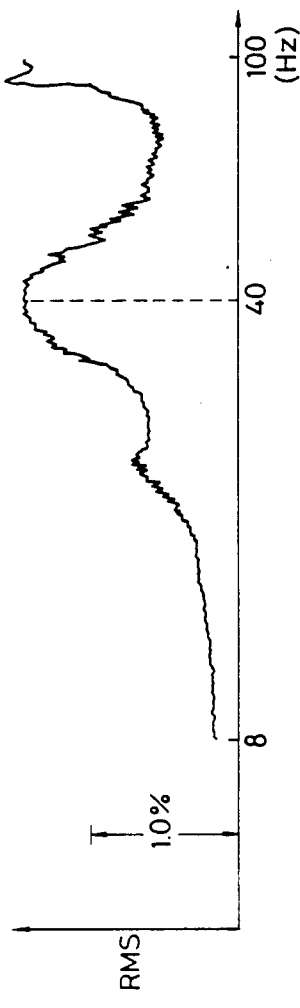
FIG. 1 is a graph showing the wow characteristics of a prior art cassette tape recorder before auditory compensation.
Figure 2:
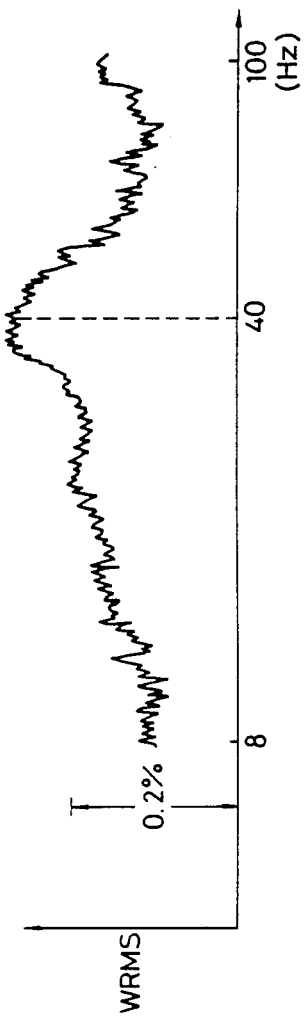
FIG. 2 is a graph showing the wow characteristics after auditory compensation of the cassette tape recorder used in FIG. 1.
Figure 3:
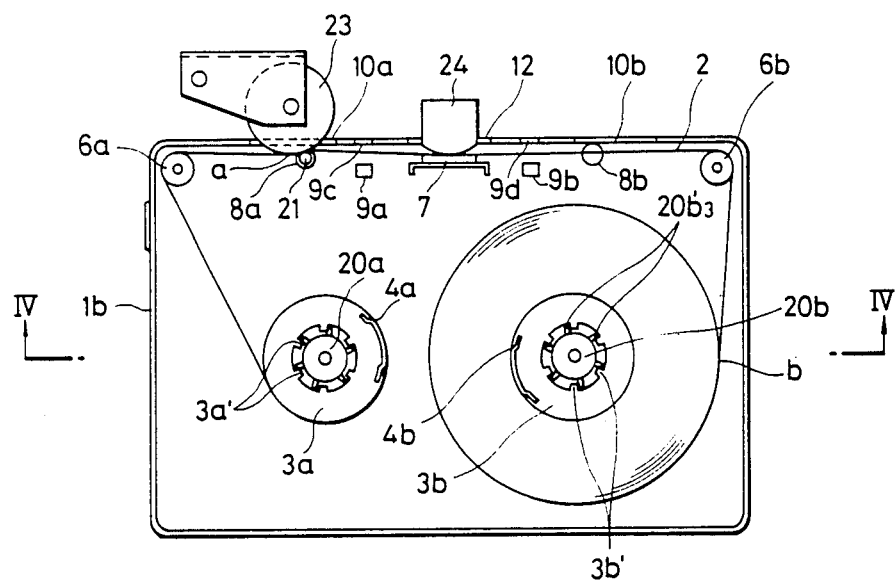
FIG. 3 is a plan view showing a prior art cassette and recorder as tested in FIGS. 1 and 2, from which an upper half is removed.
Figure 4:
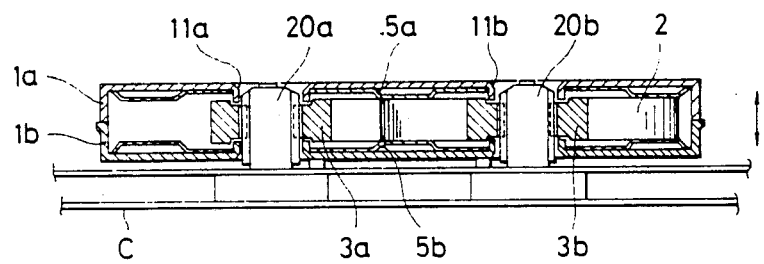
FIG. 4 is a cross sectional view of the cassette tape recorder and the cassette case taken along the line IV—IV of FIG. 3.

One embodiment of the present invention will now be described in reference to FIGS. 9 to 17, in which like members are designated by the same reference characters as used in FIGS. 3 to 8.

Figure 5:
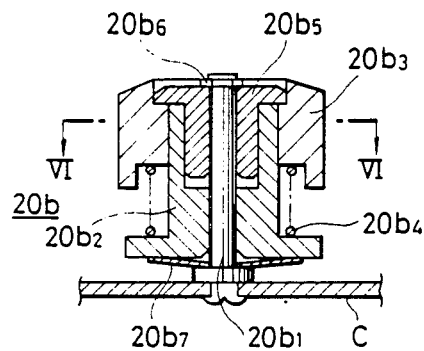
FIG. 5 is a cross sectional view showing a conventional tape supply reel shaft.
Figure 6:
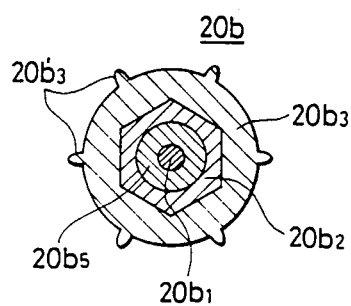
FIG. 6 is a cross sectional view of the reel shaft taken along the line VI—VI of FIG. 5.
Figure 7:
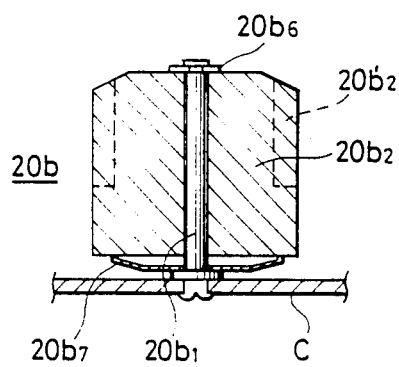
FIG. 7 is a cross sectional view showing another conventional tape supply reel shaft.
Figure 8:
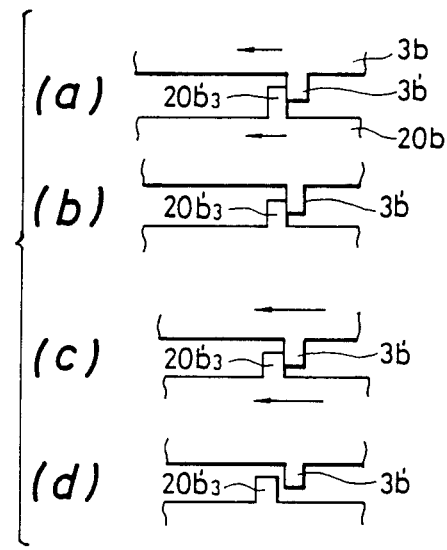
FIGS. 8a to 8d illustrate a resonance problem caused in the conventional tape supply reel shafts.
Figure 9:
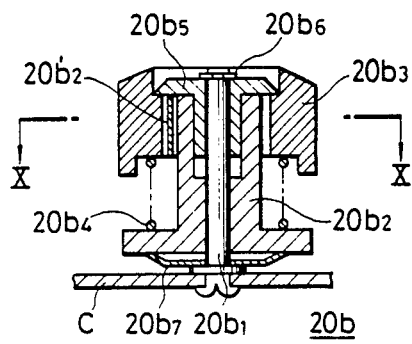
FIG. 9 is a cross sectional view of a tape supply reel shaft for use in a cassette tape recorder according to the present invention.
Figure 10:
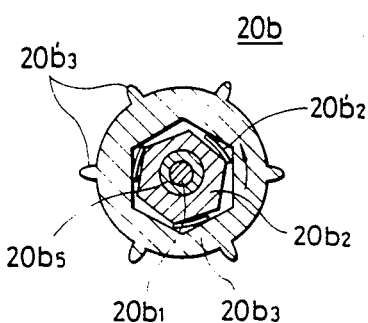
FIG. 10 is a cross sectional view of the reel shaft taken along the line X—X of FIG. 9.
Figure 11:
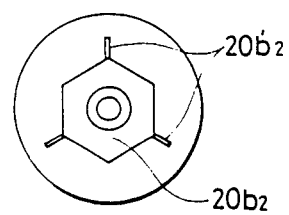
FIG. 11 is a plan view of one part of the reel shaft shown in FIGS. 9 and 10 before assembling.

FIGS. 9 and 10 show a supply reel shaft $20b$ in a oneway type cassette tape recorder. A reel shaft member $20b_2$ is made of synthetic resin so as to an outer surface of irregular, i.e. non-circular, shape. In this embodiment, the shaft member $20b_2$ has; a regular hexagonal crosssection. Thin elastic pieces $20b'_2$ are provided at every other apex of the regular hexagon as shown in FIGS. 10 and 11, and are formed integrally with the reel shaft member $20b_2$. An upper portion of the reel shaft member $20b_2$ is surrounded by a cylindrical hub $20b_3$ having a regular hexagonal hole therein. The elastic thin pieces $20b'_2$ are biased toward the inner walls of the hexagonal hole. The reel shaft member $20b_2$ and the cylindrical hub $20b_3$ are engaged with each other with respect to the rotational direction but the two members are slidable with resepct to each other in the axial direction of the reel shaft member $20b_2$. Projections $20b'_3$ which engage with the engagement projection $3b'$ of the reel $3b$ of the cassette are formed on the outer periphery of the cylindrical hub $20b_3$. As shown in FIG. 9, the reel shaft unit $20b$ comprises an upright shaft $20b_1$, a spring $20b_4$, a retaining member $20b_5$, a stopping member $20b_6$ and a leaf spring $20b_7$ each having the same functions as shown in FIG. 5.

With such a reel shaft unit $20b$, when the cylindrical hub $20b_3$ is rotated in the tape feeding direction, the reel shaft member $20b_2$ is rotated through the elastic thin pieces $20b'_2$ which elastically contact with the inner walls of the cylindrical hub $20b_3$. For this reason, even if the projections $3b'$ of the reel $3b$ of the cassette collide against the projections $20b'_3$ of the cylindrical hub $20b_3$, the generated collision is damped by the elasticity of the elastic thin pieces $20b'_2$. Accordingly, since no reactive force is generated between the reel $3b$ and the reel shaft $20b$, the situation of FIG. 8d, where the projections $3b'$ and $20b'_3$ are separated from each other, may be prevented. Therefore, the resonance of the tape 2 in the cassette is reduced, and the travelling speed of the tape 2 is not changed to such a great extent. Wow characteristics of the cassette tape recorder employing therein the reel shaft unit $20b$ shown in FIGS. 9 and 10 were measured and the results are shown in FIGS. 12 and 13. In these figures, it is shown that the wow otherwise generated at about 40 Hz in the conventional device was held to below 1% without auditory compensation and below 0.2% with the auditory compensation.

Figure 14:
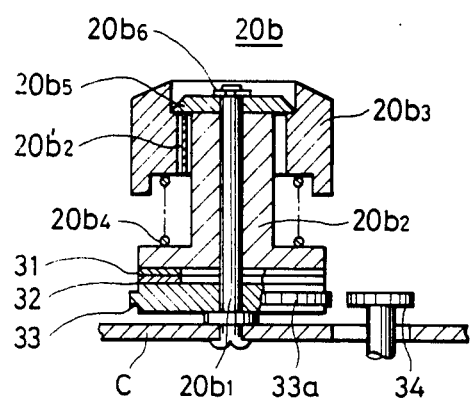
FIGS. 14 to 17 are cross sectional views of variations of the embodiment shown in FIG. 9.
Figure 15:
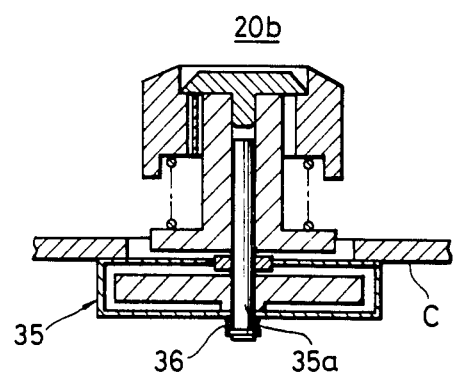

FIGS. 14 and 15 show a reel shaft unit $20b$ which is applicable to bi-directional type cassette tape recorder in which the tape can be reproduced in either direction. In this case, the reel shaft unit is used no only as a tape supply reel but also as a tape take-up reel. Additional structures which meet this requirement are provided to the reel shaft unit. $20b$. More specifically, in FIG. 14, the reel shaft unit is provided with a pully 33 coupled to the reel shaft member $20b_2$ through a friction mechanism made up of felts 31 and 32 which are pressingly coupled to each other by the spring $20b_4$. In addition, a gear 34 which is rotated by a drive source (not shown) is adapted to selectively engage with a gear 33a provided on the circumferential periphery of the above described pulley 33.

In a further embodiment in FIG. 15, a flat motor 35 operable when the reel shaft unit $20b$ is used as a tape takeup reel is fixed to the chassis, and the reel shaft unit is fixed to a rotary shaft 35a of the motor 35. In this case, when the reel shaft unit $20b$ is used as a tape supply reel, the motor is inoperative. In the same manner as in the previous embodiment, a spring 36 provided at a lower end of the rotary shaft 35a is used in order to allow a frictional force to be generated for purposes of tape back tension.

Figure 16:
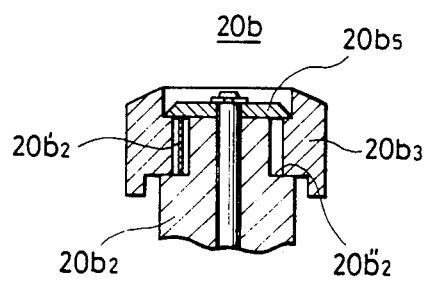

In any of the embodiments described above with reference to FIGS. 9, 14 and 15, the cylindrical hub $20b_3$ is slidable in the axial direction of the reel shaft member $20b_2$. However, such a structure need not necessarily be provided to accomplish the essential function of the reel shaft. Therefore, as shown in FIG. 16, a shouldered portion $20b''_2$ may be provided on the shaft member $20b_2$ and a cylindrical hub $20b_3$ may be interposed between the sholdered portion $20b''_2$ and a retaining member $20b_5$. In this case, means corresponding to the spring $20b_4$ are not needed.

Figure 17:
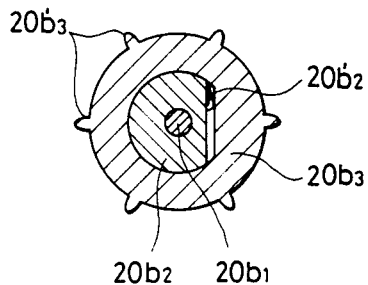

FIG. 17 shows still another embodiment of the reel shaft unit according to the present invention. In this embodiment, a cutaway surface is formed by cutting away a part of circle in cross section, thereby providing an engagement surface between the shaft member $20b_2$ and the cylindrical hub $20b_3$. A thin elastic piece $20b'_2$ which is formed integrally with the shaft member $20b_2$ and is preferably made of synthetic resin is interposed in the cutaway portion. The rotational torque of the cylindrical hub $20b_3$ is transmitted through the elastic thin piece $20b'_2$ to the shaft member $20b_2$.

As described above, according to the present invention, a pair of reel shafts are formed to be rotatable with respect to the chassis, and the reel shaft unit at least on the tape supply side inlcudes a reel shaft member having on the outer periphery at least one elastic thin piece molded of synthetic resin or plastic and integrally formed with the shaft member, and also comprises a cylindrical hub surrounding the outer periphery of the shaft member and allowing the above described elastic thin piece to contact with the inner surface of the hub. The projections which engage with the reel of the cassette are formed on the outer periphery of the cylindrical hub so that the above described shaft member is rotated through the elastic thin piece by the rotation of the cylindrical hub in the tape feeding direction.

With such a construction, even if the tape within the cassette is subjected to resonance generated by vertical vibration during playing of the cassette tape recorder, the collisions between the reel of the cassette and the projections of the cylindrical hub are damped and very little reactive force is generated therebetween. Accordingly, minimum possible resonance is generated within the tape cassette, and the wow which is noticeably generated in the prior art device may be prevented to thereby provide a cassette tape recorder having a high sound quality.

Figure 18:
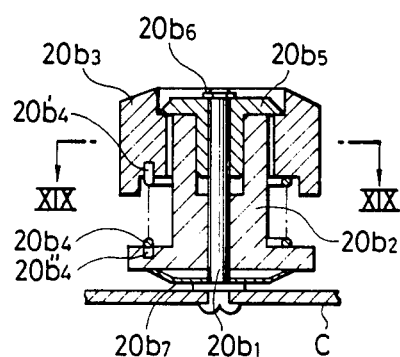
FIG. 18 is a cross sectional view showing a further embodiment of a shaft unit for the tape recorder according to the present invention.
Figure 19:
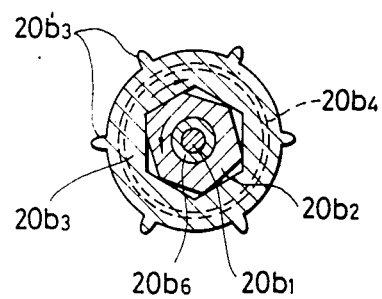
FIG. 19 is a cross sectional view taken along the line XIX—XIX of FIG. 18.

Other modifications according to the present invention will now be described with reference to FIGS. 18 to 24. FIGS. 18 and 19 show a tape supply reel shaft unit $20b$ for use with a one-way type cassette tape recorder. The reel shaft unit $20b$ has a flexible space, i.e. it fits loosely between an outer wall of shaft member $20b_2$ having a regular hexagonal cross section and an inner wall of a regular hexagonal-shaped center hole formed in cylindrical hub $20b_3$ which engages with the outer periphery of the shaft member $20b_2$ with respect to the rotational direction. A spring $20b_4$ is interposed between the shaft member $20b_2$ and the cylindrical hub $20b_3$ and is coupled fixedly at both ends $20b'_4$ and $20b''_4$ so that the shaft member $20b_2$ and the cylindrical hub $20b_3$ are biased in one rotational direction with respect to one another. Except for these features, the reel shaft unit is substantially the same as the reel shaft unit shown in FIGS. 9 and 10. The spring biasing force of the spring $20b_4$ acts as shown in FIG. 19 to rotate the shaft member $20b_2$ and the cylindrical hub $20b_3$ in opposite directions with respect to one another. It should be noted that the strength of the spring $20b_4$ is selected such that the rotation of the cylindrical hub $20b_3$ during tape feeding is transmitted to the shaft member $20b_2$ through the spring $20b_4$ rather than through abutment of mating surfaces.

Figure 20:
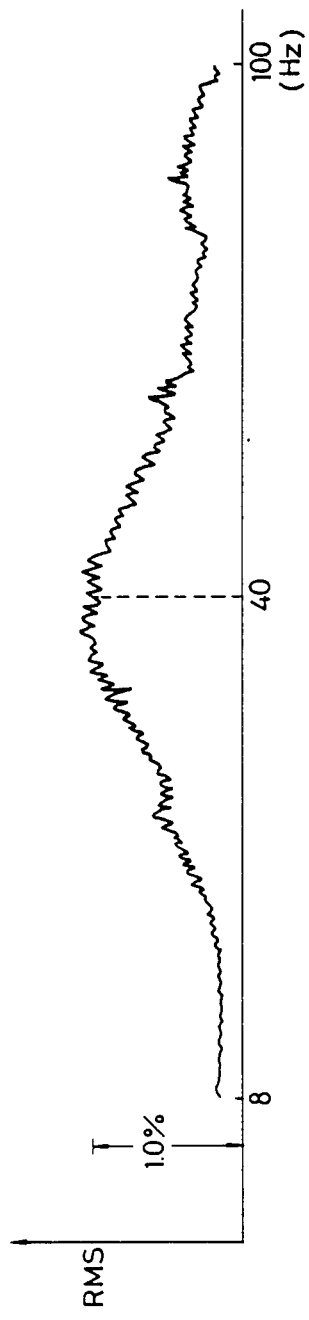
FIGS. 20 and 21 are graphs showing the wow characteristics of the tape recorder having the shaft unit shown in FIGS. 18 and 19 before and after the auditory compensation, respectively.
Figure 21:
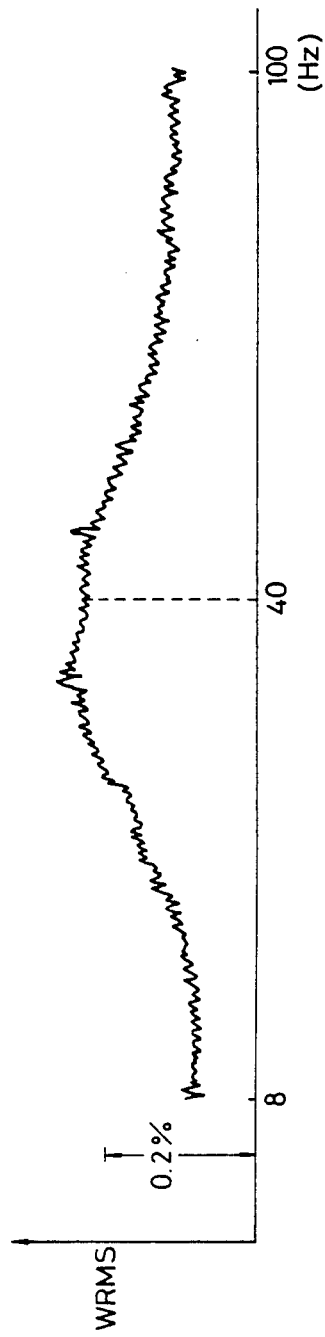

With such a construction of the reel shaft unit $20b$, even if the projections $3b'$ of the reel of the cassette collide with the projections $20b'_3$ of the cylindrical hub $20b_3$, the collision is damped by the elasticity of the spring $20b_4$. Therefore, only a week repulsive force occurs between the reel $3b$ and the reel shaft $20b$, and the separation between the projections $3b'$ and $20b'_3$ of the two members as illustrated in FIG. 8d can be prevented. As a result, a resonance of the tape 2 is reduced. As apparent from FIGS. 20 and 21 showing the measured wow characteristics according to this embodiment, wow exceeding 1% before the auditory compensation and 0.2% after the auditory compensation was entirely eliminated.

Figure 22:
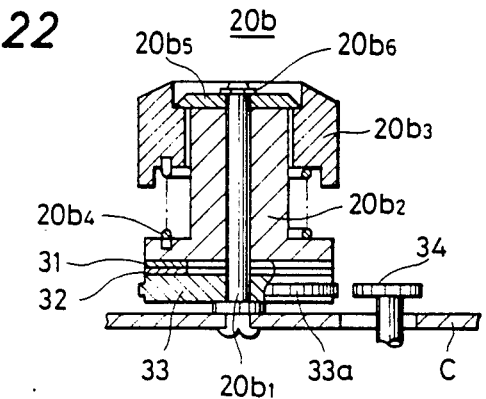
FIGS. 22 to 24 show various modifications of the shaft units according to the embodiment of FIG. 18.
Figure 23:
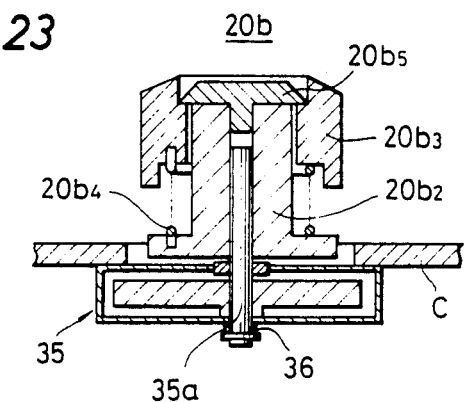
Figure 24:
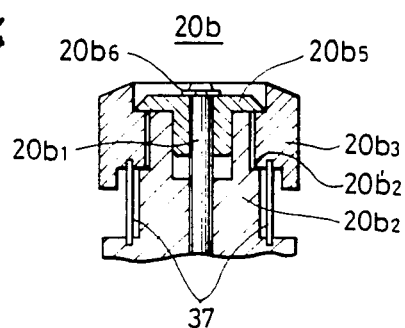

FIGS. 22 and 23 show a reel shaft unit $20b$ for use with a bi-directional type cassette tape recorder in which the tape may be played in either direction. In this case, since the reel shaft is used not only as a tape supply reel but also as a tape take-up reel, additional necessary structure is provided to the reel shaft unit similar to FIGS. 14 and 15. More specifically, in the embodiment shown in FIG. 22, a pulley 33 is additionally coupled to the reel shaft member $20b_2$ through a friction mechanism composed of felts 31 and 32 which are pressingly contacted against each other by the force of the spring $20b_4$. On the circumferenctial periphery of the pulley 33 is formed a gear $33a$ which may selectively engage with a gear 34 which is rotated by a drive source (not shown).

In the embodiment shown in FIG. 23, a flat shaped motor 35, which is rotated when the reel shaft unit $20b$ is used as a tape take-up reel, is fixed to the chassis, and a rotary shaft $35a$ of the motor 35 is fixed to the reel shaft unit $20b$. In this case, when the reel shaft unit $20b$ is used as a supply reel, the motor is not driven. In a like manner, a spring 36 provided at a lower end of the rotary shaft $35a$ serves as means for imparting a back tension to the tape 2.

In the embodiments shown in FIGS. 18, 22 and 23, the cylindrical hub $20b_3$ is slidable in the axial direction of the shaft member $20b_2$, but it is not necessary to construct the cylindrical hub to be slidable in order to achieve the essential purpose of this invention. Accordingly, in FIG. 24, a shouldered portion $20b'_2$ may beformed in the shaft member $20b_2$ so that the cylindrical hub $20b_3$ can be clamped between the shouldered portion $20b'_2$ and a retaining member $20b_5$. In addition, a plurality of elastic wires 37 may be used instead of the coil spring $20b_4$ to impart opposite biased force between the shaft member $20b_2$ and the cylindrical hub $20b_3$. The wires 37 are each fixed at either end to the shaft member $20b_2$ and the cylindrical hub $20b_3$.

Furthermore, although the cross-section of the shaft member $20b_2$ is a regular hexagonal shape in the foregoing embodiments, it will be readily understood that any other non-circular shape, e.g. such as a regular triangle, may be used in order to obtain substantially the same effect.

Still other embodiments will now be described with reference to FIGS. 25 to 37 in which the same reference characters as used hereinabove are used to designate like members and components.

Figure 25:
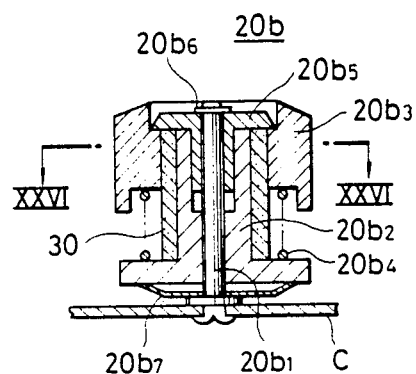
FIG. 25 is a cross sectional view showing a still further embodiment of a shaft unit for the tape recorder according to the present invention.
Figure 26:
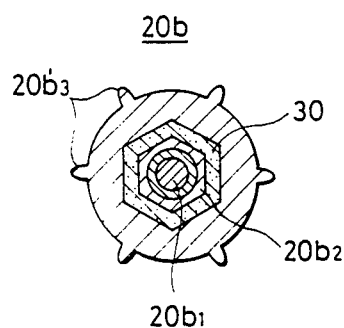
FIG. 26 is a cross sectional view taken along the line XXVI—XXVI of FIG. 25.
Figure 27A:
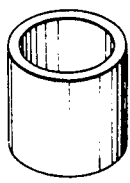
FIGS. 27a and 27b show tubular members used in the shaft unit of FIGS. 25 and 26.
Figure 27B:
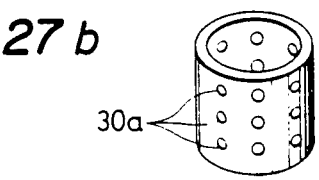

FIGS. 25 and 26 show a reel shaft unit $20b$ on the tape supply side, used with the one-way type cassette tape recorder. A viscous elastic member 30 formed in a cylindrical shape and made of, e.g. plain rubber, butyl rubber or the like as shown in FIGS. 27 $a$ and $b$ is mounted on the outer periphery of the shaft member $20b_2$ having a regular hexagonal cross section. The rubber tube is deformed in compliance with the hexagonal shape of the shaft member when mounted on the shaft member $20b_2$ as shown in FIG. 26. On the outer periphery of the viscous member 30 is provided cylindrical hub $20b_3$ having on its outer periphery a plurality of projections $20b'_3$ which may engage with the projections $3b'_3$ of the reel $3b$ of the cassette. With such an arrangement, the cylindrical hub $20b_3$ and the shaft member $20b_2$ are engaged with each other in the rotational direction and are rotated together through the viscous elastic member 30. However, the cylindrial hub $20b_3$ is slidable with respect to the shaft member $20b_2$ in the axial direction of the shaft member. A number of holes $30a$ may be formed in the rubber tube shown in FIG. 27b so that the viscous elastic member 30 may be more easily deformed.

Figure 28:
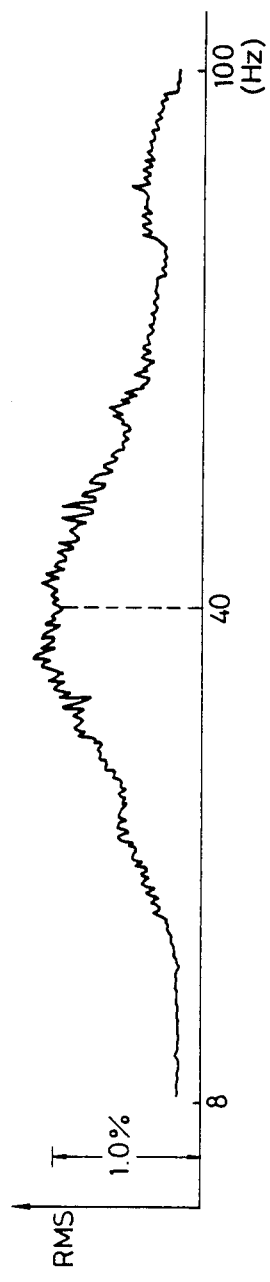
FIGS. 28 and 29 are graphs showing the wow characteristics before and after auditory compensation, respectively, of the tape recorder having the shaft unit shown in FIGS. 25 and 26.
Figure 29:
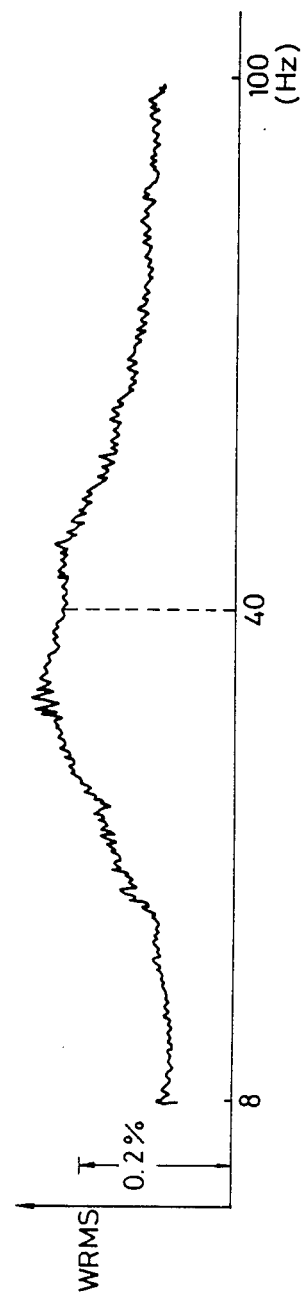

With such a construction, even if the projections 3b' of the cassette reel 3b collide against the projections 20b'₃ of the cylindrical hub 20b₃, the collision is damped by deformation of the viscous elastic member 30 as a result of which only a small reactive force will be generated between the reel 3b and the reel shaft unit 20b, and the separation shown in FIG. 8a may be prevented. Consequently, the resonance of the tape is reduced, and the measured wow characteristics according to the embodiment shown in FIGS. 25 and 26 are shown in FIGS. 28 and 29. As shown therein, wow exceeding 1% and 0.2% at about 40 Hz before and after the auditory compensation, respectively, may be eliminated according to this embodiment.

Figure 30:
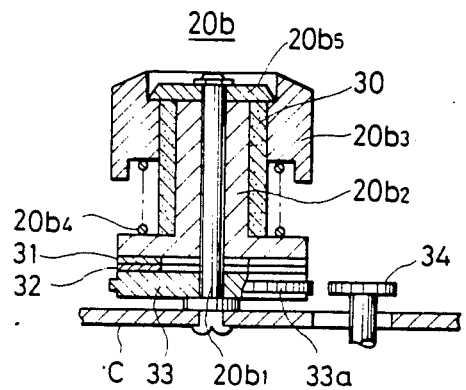
FIGS. 30 and 32 show various modifications of the shaft units according to the embodiment of FIG. 25.
Figure 31:
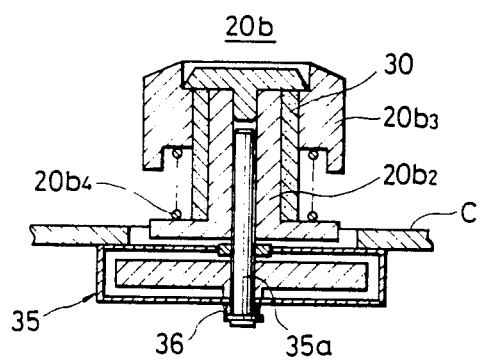
Figure 32:
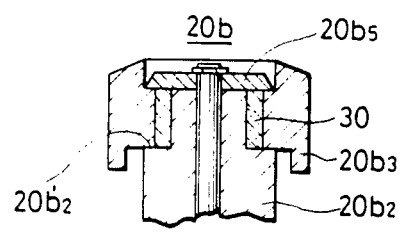

FIGS. 30-32 show modifications of this embodiment similar to the modifications of the first embodiment shown in FIGS. 14-16. FIGS. 30 and 31 show a reel shaft unit 20b used with a bi-directional type cassette tape recorder in which the tape is reproduced in either direction of travelling. As described before, the reel shaft unit is thus used as not only a tape supply reel but also a tape take-up reel, which requires additional structure or components. More specifically, a pulley 33 is mounted on the shaft member 20b₂ through a friction mechanism composed of felts 31 and 32 pressingly coupled to each other by the spring 20b₄. A gear 33a formed on the outer periphery of the pulley 33 may selectively engage with a gear 34 driven by a drive source (not shown).

In FIG. 31, as described before, a flat-shaped motor 35 which is rotated when the reel shaft unit 20b is used as a tape take-up reel is fixed to the chassis, and a rotary shaft 35a of the motor 35 is fixed to the reel shaft unit 20b. In this case, when the reel shaft unit 20b is used as a supply reel, the motor is not driven. In a like manner, a spring 36 provided at a lower end of the rotary shaft 35a serves as means for imparting a back tension to the tape 2. In the embodiments shown in FIGS. 25, 30 and 31, the cylindrical hub 20b₃ is slidable in the axial direction of the shaft member 20b₂. As before, this is not necessary and a shouldered portion 20b'₂ may be formed in the shaft member 20b₂ so that the cylindrical hub 20b₃ can be clamped between the shouldered portion 20b'₂ and a retaining member 20b₅ as shown in FIG. 32. In this case, the member corresponding to the spring 20b₄ may be dispensed with.

FIGS. 33 to 37 show other modifications according to this embodiment of the present invention. FIG. 33 shows a reel shaft unit 20b having a regular triangular cross section. A rod-shaped viscous elastic member 30' is interposed at every other area of the center hole 37 of the regular pentagonal shape of the cylindrical hub 20b₃, between the inner surface of the hole 37 and each surface of the triangular shaft member 20b₂. When operating as a supply reel, the shaft member 20b₂ and the cylindrical hub 20b₃ are rotated together against the frictional force produced by the leaf spring 20b₇ (FIG. 25), the spring 36 (FIG. 31), or the spring 20b₄ (FIG. 30), all of which serve to produce a back tension to the tape 2, without the shaft member 20b being in direct contact with the cylindrical hub 20b₃. However, when the reel shaft unit 20b is used as the tape take-up reel, the shaft member 20b₂ is in direct contact with an inner wall of the center hole 37 of the cylindrical hub 20b₃ so that the cylindrical hub 20b₃ is rotated. Incidentally, the viscous member 30' is preferably made of a plain rubber, butyl rubber or the like. The member 30' may form in a hollow tube, a solid triangular post, a rectangular solid post, or the like, as shown in FIG. 34.

In FIG. 35, the shaft member 20b₂ of the reel shaft unit 20b is formed in a circular cross-sectional shape. A projection 38a and a concave portion 38b are alternately formed in the circumference of the shaft member 20b₂ at an interval of, e.g. 60°. In compliance with this, a concave portion is formed at 60° intervals in the inner wall of the center hole 37 of the cylindrical hub 20b₃. Viscous elastic members 30'' are interposed between the concave portion 38b of the shaft member 20b₂ and the associated concave portions 37a of the cylindrical hub 20b₃. With this arrangement, the projections 38a of the shaft member 20b₂ are confronted with the concave portions 37a of the cylindrical hub 20b₃, and when operating as a tape supply, the rotational torque of the cylindrical hub 20b₃ is transmitted to the shaft member 20b₂ through the viscous elastic members 30'' without the projections 38a being in contact with the walls of the concave portions 37a. On the other hand, when the reel shaft unit is used as a takeup reel, the projections 38a are in direct contact with the walls of the concave portions 37a to thereby allow the cylindrical hub 20b₃ to rotate suitably.

In FIGS. 36 and 37, the shaft member 20b₂ and the cylindrical hub 20b₃ are engaged with each other in a coupling key manner. At the key portion of the shaft member 20b₂ is implanted a viscous elastic member 30'''which abuts the wall of the cylindrical hub 20b₃ when the cylindrical hub 20b₃ is rotated in the tape supply direction. Therefore, during tape feed, the shaft member 20b₂ is rotated through the viscous elastic member 39'''together with the rotation of the cylindrical hub 20b₃.

Figure 44:
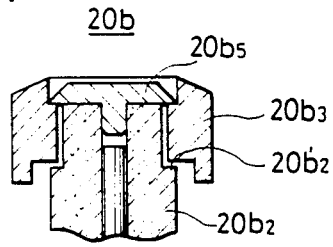

FIGS. 38 and 44 show still other embodiments according to the present invention. FIGS. 38 and 39 show a reel shaft unit 30b on the tape supply side used with a one-way type tape recorder for tape cassettes. A shaft member 20b is made of plain rubber, butyl rubber or the like, and is formed with a substantially regular hexagonal cross-section. In particular, each apex of the hexagonal shape of the shaft is formed in a somewhat sharp shape so that the apexes may be deformed by a relatively weak pressure. A tubular member 20b'₅ extending from the retaining member 20b₅ is inserted into a center hole of the shaft member 20b₂. Through the retaining member 20b₅ the tubular member 20b'₅ is rotatably supported around an upright shaft 20b₁. A cylindrical hub 20b₃ is adapted to surround the outer periphery of the shaft member 20b₂, having a regular hexagonal shaped hole therein. The shaft member 20b₂ and the cylindrical hub 20b₃ are rotated together in the rotational direction bu the two members are slidable in the axial direction. The spring 20b₄ and the leaf spring 20b₇ have the same functions as described before.

With such a construction of the reel shaft member 20b, even the projections 3b' of the reel 3b of the cassette case collide against the projections 20b'₃ of the cylindrical hub 20b₃, the collision is damped by the deformation of the shaft member 20b₂. As a result, only a small repulsive force is generated between the shaft member 20b₂ and the reel shaft 20b, so that the separation between the projections 3b' and 20b'₃ as shown in FIG. 8d can be prevented. Thus, the resonance is reduced.

Figure 40:
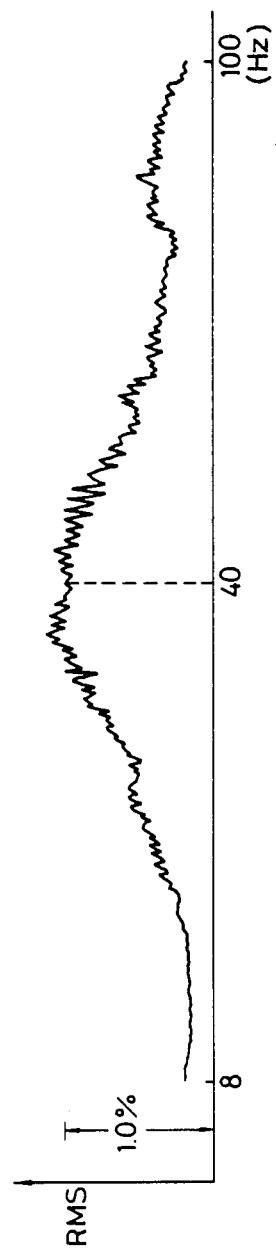
FIGS. 40 and 41 are graphs showing the wow characteristics before and after auditory compensation, respectively, Of the tape recorder having the shaft unit shown in FIGS. 38 and 39.
Figure 41:
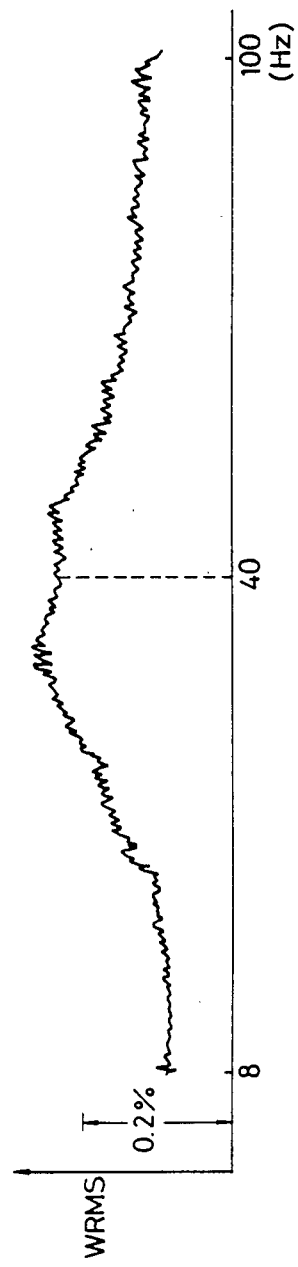

The characteristics of wow according to the embodiment shown in FIGS. 38 and 39 are shown in FIGS. 40 and 41 before and after the auditory compensation, respectively. As is apparent from the results shown, wow exceeding 1% and 0.2% at about 40 Hz are entirely eliminated.

Figure 42:
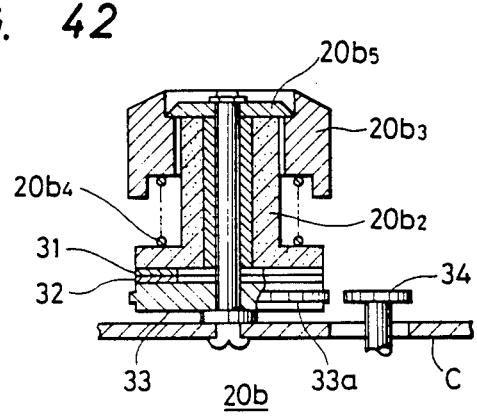
FIGS. 42 to 44 show various modifications of the shaft units according to the embodiment of FIG. 38.
Figure 43:
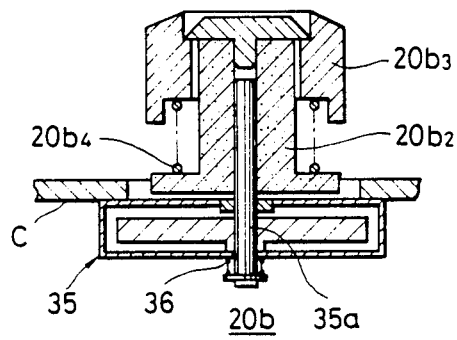

FIGS. 42 to 44 show various shaft units used with a bi-directional type cassette tape recorder in which the tape may travel in either direction. In this case, also, the reel shaft unit is used both as take-up reel and as a supply reel, which requires additional structure or components. More specifically, in FIG. 42, a pulley 33 is mounted on the shaft member $20b_2$ through frictional mechanism made up of felts 31 and 32 pressingly coupled to each other by a spring $20b_4$. A gear $33a$ formed on the outer periphery of the pulley 33 may selectively engage a gear 34 driven by a driven source (not shown).

In FIG. 43, a flat shaped motor 35 which is rotated when the reel shaft unit $20b$ is used as take-up reel is fixed to the chassis C, and a rotary shaft $35a$ of the motor 35 is fixed to the reel shaft unit $20b$. In this case, when the reel shaft unit $20b$ is used as a supply reel, the motor is not driven. In a like manner, a spring 36 provided at a lower end of the rotary shaft $35a$ serves to impart a back tension to the tape 2.

In the embodiments shown in FIGS. 38, 42 and 43, the cylindrical hub $20b_3$ is slidable in the axial direction of the shaft member $20b_2$. It is not necessary to construct the cylindrical hub to be slidable and a shouldered portion $20b'_2$ may be formed in the shaft member $20b_2$ so that the cylindrical hub $20b_3$ can be clamped between the shouldered portion $20b'_2$ and a retaining member $20b_5$ as shown in FIG. 44. In this case, the member corresponding to the spring $20b_4$ may be dispensed with.

In the embodiments described above, specific cross sections are disclosed for the shaft member. However, it is sufficient that the engagement portions of the shaft member have a viscous elasticity in the rotational direction with suitable elastic materials.

What is claimed is:

1. A cassette tape machine of the type having at least one rotatable shaft unit, said rotatable shaft unit having an outer surface of irregular shape, and hub means rotatable with said shaft unit and having an outer periphery for engaging a tape reel in a cassette, said hub means having an inner surface of a mating irregular shape to said outer surface and surrounding said outer surface, said tape reel being rotatable in tape supply and take-up directions whereby said means rotates said shaft unit in said supply direction, the improvement comprising: resilient coupling means for resiliently coupling the rotational force of said hub to said shaft unit when said hub rotates in said supply direction, said resilient coupling means including at least one resilient member disposed between said inner and outer surfaces and biased outwardly from said shaft unit against said inner surface.

2. A cassette tape machine as claimed in claim 1, wherein said shaft unit comprises a sleeve member ($20b_2$) coupled to a reel shaft for rotation therewith, said at least one resilient member being secured to said sleeve member.

3. A cassette tape machine as claimed in claim 1, wherein said at least one resilient member slidably engages said inner surface during rotation of said hub in said supply direction.

4. A cassette tape machine as claimed in claim 1, wherein said inner surface is polygonal and said at least one resilient member comprises a plurality of resilient members for engaging different faces of said polygonal inner surface.

5. A cassette tape machine as claimed in claim 4, wherein said plurality of resilient members slidably engage said faces.

6. A cassette tape player as claimed in claim 5, wherein said shaft unit is frictionally coupled to a reel shaft.

7. A cassette tape player as claimed in claim 4, wherein said polygonal outer surface includes a plurality of apexes and said resilient members are secured to respective apexes of said polygonal outer surface, said resilient members extending away from said apexes in said supply direction.

8. A cassette tape machine as claimed in claim 1, wherein said shaft unit has an outer surface with only one flat portion in facing relation to a single flat portion of said inner surface, the rest of said inner and outer surfaces slidingly engaging one another, said resilient means abutting against said one flat portion of said inner surface.

9. A cassette tape machine of the type having at least one rotatable shaft unit with a polygonal outer surface having a plurality of apexes, and hub means rotatable with said shaft unit and having an outer periphery for engaging a tape reel in a cassette, said hub means having a polygonal inner surface surrounding said outer surface, said tape reel being rotatable at least in a tape supply direction whereby said hub means rotates said shaft unit in said supply direction, the improvement comprising:

resilient coupling means for resiliently coupling the rotational force of said hub to said shaft unit when said hub rotates in said supply direction, said resilient coupling means including a plurality of resilient members secured to respective ones of said apexes and extending away from said apexes in said supply direction to resiliently engage said inner surface.

* * * * *